United States Patent
Musial

(10) Patent No.: US 6,345,042 B1
(45) Date of Patent: Feb. 5, 2002

(54) METHOD FOR CHECKING A DATA EXCHANGE BASED ON A COMMUNICATION PROTOCOL

(75) Inventor: Marek Musial, Berlin (DE)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/068,878

(22) PCT Filed: Sep. 19, 1997

(86) PCT No.: PCT/DE97/02178

§ 371 Date: Feb. 22, 2000

§ 102(e) Date: Feb. 22, 2000

(87) PCT Pub. No.: WO98/12852

PCT Pub. Date: Mar. 26, 1998

(30) Foreign Application Priority Data

Sep. 20, 1996 (DE) .......................................... 196 40 346

(51) Int. Cl.[7] .............................. G01R 31/08; H04J 1/16
(52) U.S. Cl. ....................................................... 370/241
(58) Field of Search ................................ 370/241, 245, 370/464, 449, 468, 452, 453, 471, 229, 419; 709/201, 204, 224, 237, 312, 315, 230; 710/11; 713/201; 379/197; 455/427, 453; 704/246; 714/79, 748, 738, 755

(56) References Cited

U.S. PATENT DOCUMENTS 4,888,778 A * 12/1989 Brechard et al. ............ 714/755

5,347,524 A * 9/1994 I'Anson et al. ............... 714/39
5,448,561 A * 9/1995 Kaiser et al. ................ 370/471
5,659,555 A * 8/1997 Lee et al. .................... 714/738

* cited by examiner

*Primary Examiner*—Douglas Olms
*Assistant Examiner*—Phirin Sam
(74) *Attorney, Agent, or Firm*—Thomas F. Lenihan; Francais I. Gray

(57) ABSTRACT

The present invention relates to a method for checking a data exchange between participants in a call established on a communication medium in compliance with a protocol. In order to identify the various stages in a call process conforming to the protocol and to break said protocol once the checking procedure has started, the invention suggests that the data exchange be captured by-means of a protocol monitor (PM) connected to a communication medium (CM) and based on the finite state automaton principle. The test automaton contains the same states and state variables as the protocol automaton designed to define the communication protocol, apart from the fact that the test automaton is allocated a plurality of values within the same range of corresponding state variable values in the protocol automaton. The transitions in the protocol automaton as observed on the communication medium (CM) are simulated for investigation purposes in the test automaton and, by a process of logical elimination, a state is shaped in the test automaton which matches the relevant state in the protocol automaton.

3 Claims, 3 Drawing Sheets

METHOD FOR CHECKING A DATA EXCHANGE BASED ON A COMMUNICATION PROTOCOL

BACKGROUND OF THE INVENTION

Figure 1:
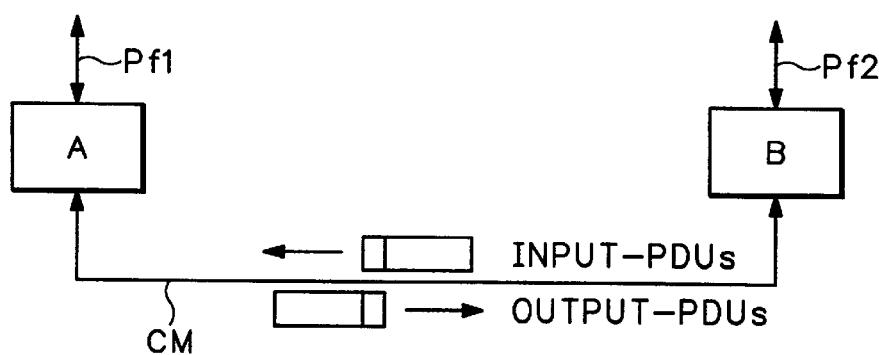

It is a known fact that communication participants exchange data with one another in compliance with a communication protocol. An arrangement for performing a data exchange in this manner is shown in FIG. 1. Communication participants A and B communicate with one another via a communication medium (CM) such as an electrical line by exchanging messages or protocol data units (PDUs) in accordance with a communication protocol. The communication protocol constitutes a complete set of rules for the required behaviour of each participant A and B in the communication. Participants A and B are instances in the sense of the OSI reference model which is described in more detail in "ISO. Information Processing Systems—Open Systems Interconnection—Basis Reference Model" International Standard ISO/IS 7498, ISO, 1984.

It is the object of the present invention to capture the timing of communication states of the one or the other participant in the communication which occur according to the communication protocol and to detect violations of the communication protocol as they occur.

BRIEF SUMMARY OF THE INVENTION

For accomplishing this object, a method for checking a data exchange between communication participants via a communication medium in accordance with a communication protocol, said method being defined based on the extended finite state automaton principle, captures the data exchange by means of a protocol monitor connected to the communication medium and containing a test automaton which latter is likewise defined based on the extended finite state automaton principle. Said test automaton contains the same states and state variables as the protocol automaton defining the communication protocol, apart from the fact that in the test automaton, one value of the state variable is allocated a plurality of values from the range of values of corresponding state variables of the protocol automaton. Based on a state of the test automaton which comprises all states and all values of the state variables of the protocol automaton, transitions of the protocol automaton as observed on the communication medium are speculatively simulated in the test automaton and, by a process of logical elimination, a state is shaped in the test automaton which matches the relevant state in the protocol automaton.

An essential advantage of the method according to the invention is that it allows the data exchange to be checked at any random start, i.e. without knowledge of the current state of the communication, since the protocol monitor is capable of concluding the state of the communication participants from the data captured on the communication medium.

Frequently the communication exchange between communication participants takes place on the basis of communication protocols which are defined on the principle of a plurality of cooperating extended finite state automatons. In such a case, in order to gain insight into the communication state without excessive computational work and in relatively short time, if the inventive method is applied in a data exchange between communication participants in compliance with a communication protocol, said method being defined on the principle of a plurality of cooperating extended finite automatons, the protocol monitor contains test automatons in a number corresponding to the number of the extended finite state automatons defining the communication protocol, with each test automaton being defined by states and state variables corresponding to the relevant allocated automaton of the communication protocol.

BRIEF DESCRIPTION OF THE SEVERAL VIEWS OF DRAWINGS

FIG. 1 is a block diagram view of an arrangement for performing a data exchange in compliance with a communication protocol according to the prior art.

Figure 2:
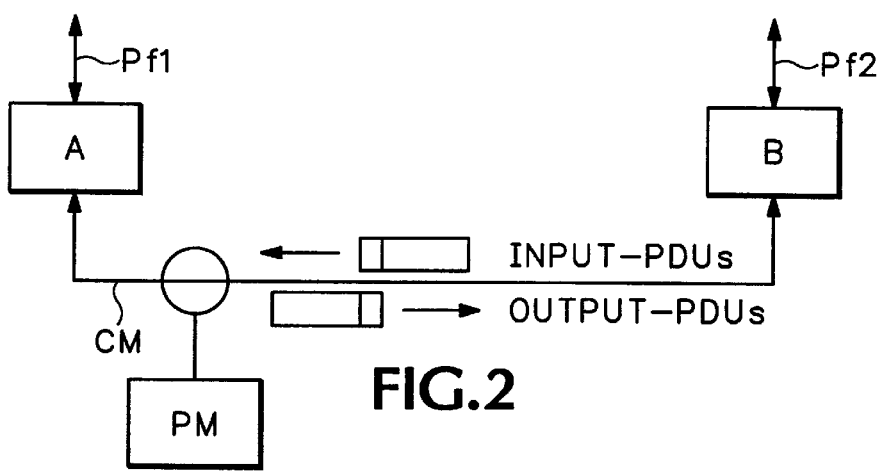
Figure 5:
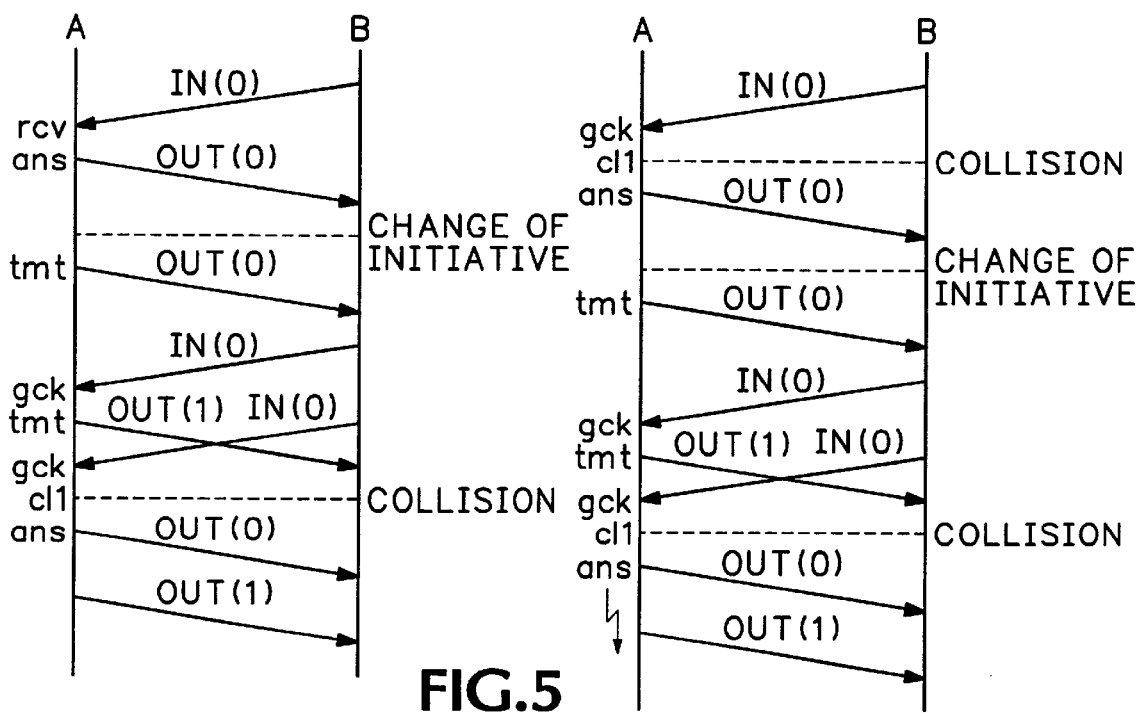
Figure 3:
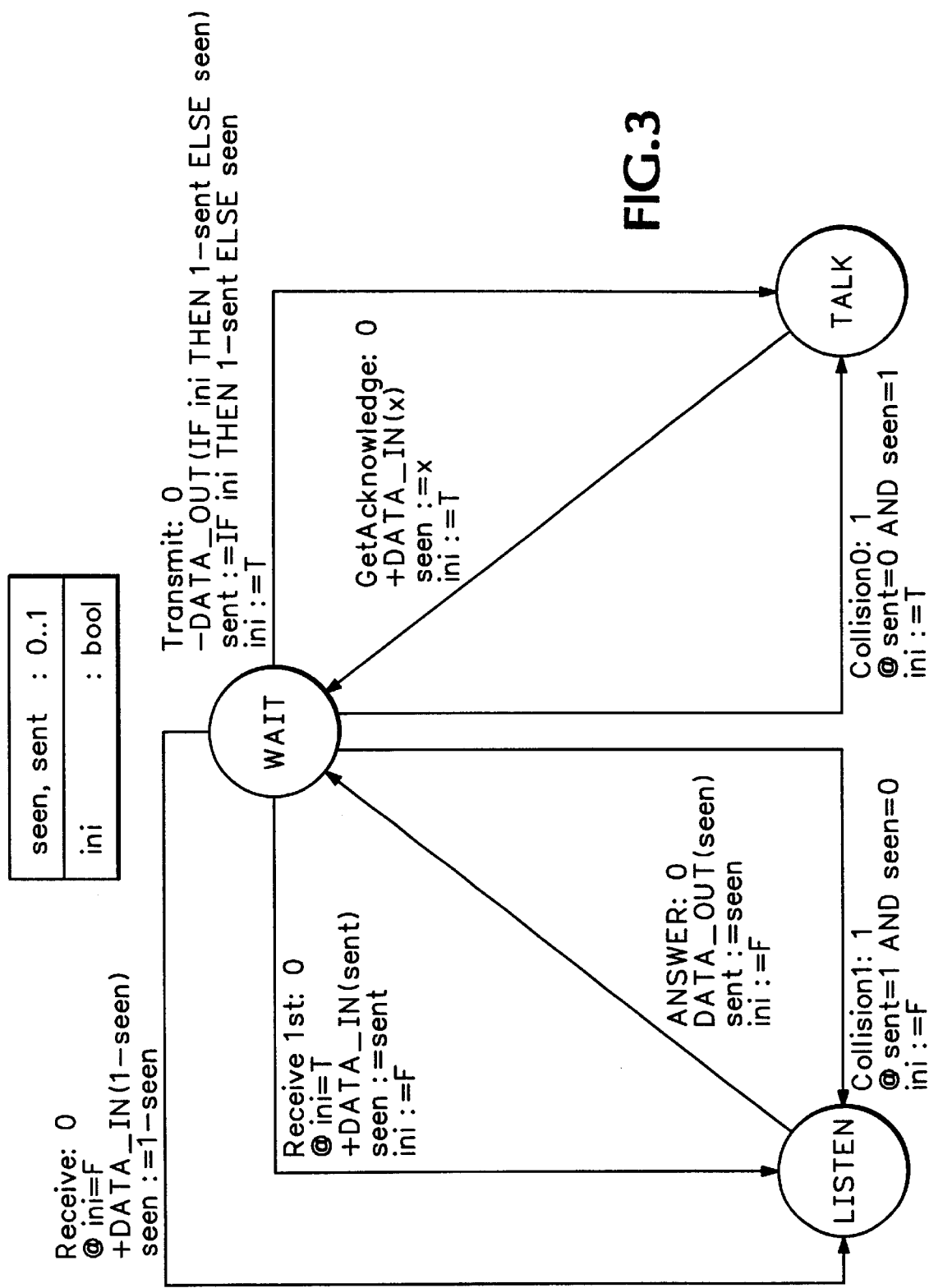
Figure 4:
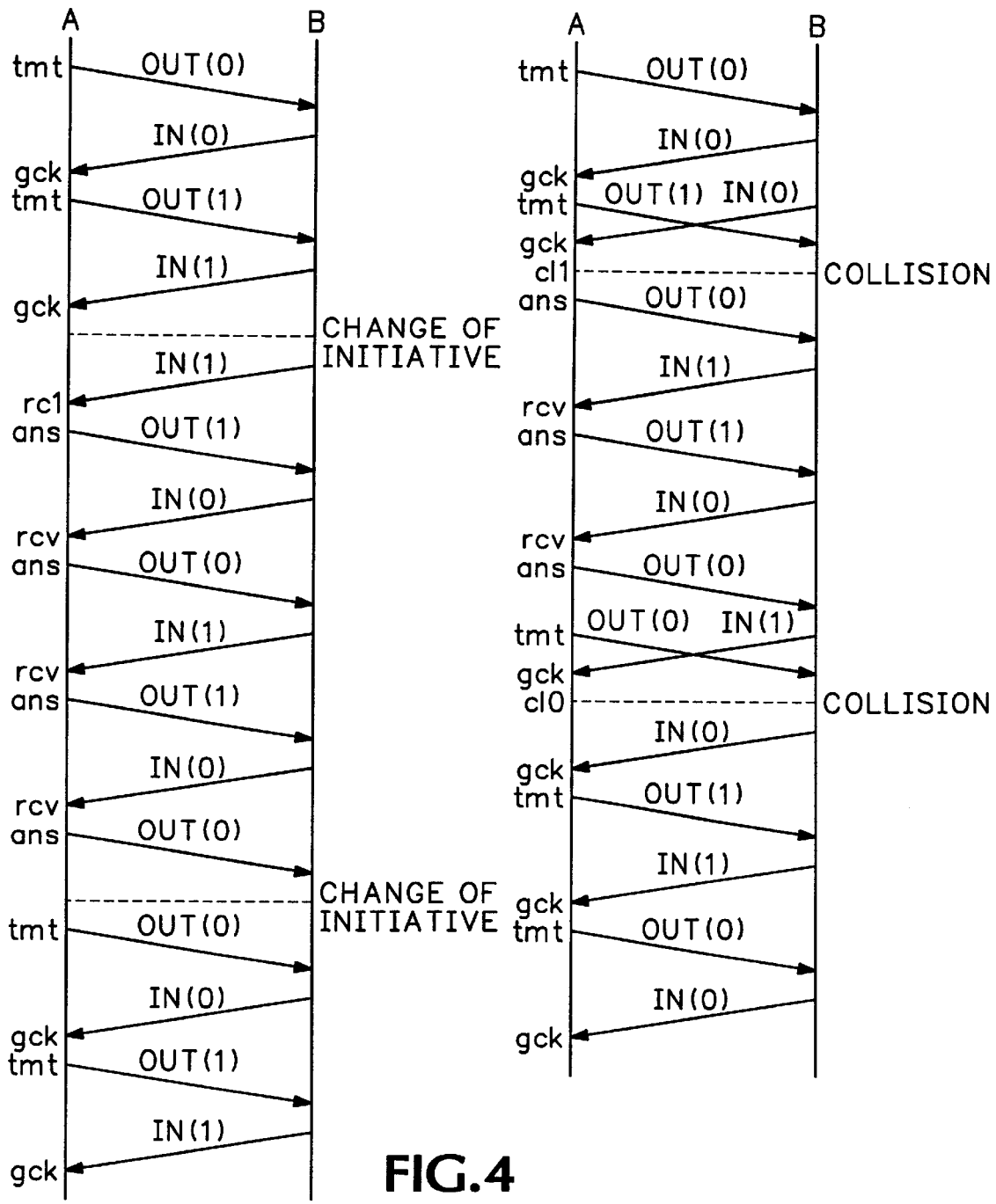

FIG. 2 a block diagram view of an arrangement for performing the method according to the invention, FIG. 3 a state diagram of an exemplary protocol automaton, FIG. 4 a correct protocol flow with the exemplary protocol automaton, and FIG. 5 the result of the data exchange check according to the exemplary protocol automaton.

DETAILED DESCRIPTION OF THE INVENTION

As can be seen in FIG. 2, in which parts identical to those of FIG. 1 are marked with the same reference symbols, a protocol monitor PM is connected to the communication medium M in such a manner that the former is capable of capturing the data exchanged between communication participants A and B via the communication medium CM. In this process, the protocol monitor PM simultaneously also reads all the messages exchanged without changing them and without influencing the communication between A and B in any way. The protocol monitor PM does not receive any further information; in particular, it does not have access to the service primitives exchanged with the users of communication participants A or B, said primitives being schematically shown in FIG. 2 indicated by arrows Pf1 and Pf2. More information on said service primitives may likewise be gathered from the above mentioned publication.

Before proceeding with the description of the method according to the invention, we consider it necessary to make a few preliminary remarks:

For determining both communication states and protocol violations, a description of the protocol on which the communication is based is required which is included in the protocol monitor PM. The appropriate and usual principle for defining communication protocols is the extended finite state machine (EFSM) as described for example in the textbook by D. Hogrefe entitled "Estelle, LOTOS and SDL: Standard-Spezifikationssprachen fur verteilte System", Springer Compass. Springer Verlag, Berlin, Heidelberg, New York etc., 1989. It is a generalization of the finite state machine (FSM) explained for instance in "Proceedings of the 1994 International Symposium on Software Testing and Analysis (ISSTA)", ACM SIGSOFT Software Engineering Notes, Special Issue, pages 109 to 124, August 1994.

In conventional protocol standards, a communication protocol is always described—on different formality levels—based on this state automaton principle. For this reason, the protocol definition contained in the protocol monitor PM is likewise based on an extended finite state automaton.

In the following, a protocol automaton, designated M, constitutes the extended finite state automaton which predetermines the rules for the behaviour of communication participant A that can be observed on the communication medium CM.

Just as any common extended finite state automaton, the protocol automaton M also contains a number of states and state variables, with each variable at any time having a certain value from its range of values. The communication protocol to be monitored is defined on the basis of such a protocol automaton M.

In accordance with the invention, a test automaton F is used by means of the protocol monitor PM which former contains the same states and state variables as the protocol automaton M. However, each state variable in the test automaton F may at any time be allocated a whole selection of values from the range of values of the corresponding state variable in the protocol automaton M.

Expressed in mathematical terms, the test automaton F constitutes an extended finite state automaton having state variables of the same name as the protocol automaton M, but whose range of values are the power sets of the corresponding value ranges from the protocol automaton M.

Let's assume now that the protocol automaton M contains a state variable "colour" which can take the values "black" and "white". The corresponding state variable "colour" of the test automaton F may then symbolize any subset of this range of values, its four possible occupancies thus being {}, {white}, {black} and {black, white}.

Each occupancy of the state variables of the test automaton F represents a plurality of states for the protocol automaton M which are to be taken into account. A state of the test automaton F may thus be considered a coarse state description for the protocol automaton M. For example, the last one of the four possibilities mentioned in the example indicates that nothing is known about the occupancy of the state variable "colour" of the protocol automaton M. Once all state variables of the test-automaton F have been assigned the entire value range of the relevant state variables of the protocol automaton M in such a manner, then this implies that the entire state of the protocol automaton M is completely unknown. This is the typical situation at the time of the communication connection test start.

The state transitions of the test automaton F to be used for performing the method according to the invention, in the following referred to as transitions, are directly derived from the transitions of the protocol automaton M. Since there has not been any uniform definition for extended finite state automatons in the specialist literature so far, it seems necessary, in order to facilitate an understanding of what will be set out further below, to define the kinds and components of transitions in the meaning as used hereinafter.

A transition shall contain the following information:

State condition.

This is a logical function which determines—as a function of the basic state and the values of the state variables of the protocol automaton M—whether the transition will be able to switch in a given state. For the special case of a —non-extended—finite state automaton, the state condition will just define the initial state of a transition.

Specification of the input message.

The switching of a transition may be initiated by the reception of a message from the communication participant which-is being monitored. The type of such message as well as the expected values of parameters which may have been coded into such message will determine the input behaviour of the transition. The expected message parameters may-be determined as a function of the state variables of the protocol automaton M. A transition will be able to switch from a given state if, and only if, such state fulfills the state condition and a message is received which is conformal with the specification of the input message of the transition. If the transition does not come with an input message, the second half of the condition will not apply.

Specification of the output message.

When a transition is switched, an output message may be generated. The type of such message as well as the admissible values of message parameters determine the output behaviour of the transition. The admissible message parameters may be determined as a function of the state variables of the protocol automaton M. If the transition does not come with an output message, then no output will be generated when the transition is being switched.

State transformation.

This is a function which determines the sequential occupancies of-all state variables after switching-of the transition based on a state of the protocol automaton M and potential message parameters of the input and output messages. For the special case of a—non-extended—finite state automaton, the state transformation will just indicate the target state of the transition.

Priority.

A numerical constant which will be used for selecting the switching transition when there is a plurality of switchable transitions. If transitions T1 and T2 are switchable as defined in the above mentioned conditions, transition T1 will exclude competing transition T2 from the next state transition if, and only if, the following two conditions have been fulfilled:

T1 has a higher priority than T2.

T1 does not expect an input message, or T2 expects an input message.

The second condition will prevent input transitions from excluding transitions without input. This will ensure that a protocol automaton "in operation" can execute other actions before the subsequent input message has actually been received.

If, despite this priority rule, several switchable transitions remain, a selection from amongst them will be made on a non-deterministic basis.

When the method according to the invention is performed, the protocol monitor PM will monitor the internal state of the observed instance and/or for example communication participant A, namely by means of coarse state descriptions on the side of the test automaton F as set out heretofore. Upon test start, test automaton F in the protocol monitor PM will present a totally unknown state of the protocol automaton M at communication participant A in the manner described above.

The protocol monitor PM will then apply the transitions defined for the protocol automaton M to its test automaton F. As compared to the above defined term switchability for the transitions in the protocol automaton M, two changes will result therefrom:

1. The outputs of the exemplarily monitored protocol automaton A are known from observation. Consequently, in addition to the question of whether a transition is switchable, there will be the further aspect of switching consistency: A transition which is capable of being switched in one state of the protocol automaton M will be considered to be consistently switchable if, and only if, an output specification which may be associated therewith is compatible with the subsequent output message due to be dealt with in the observed communication.

2. Since each state of the test automaton F will in general represent a number of states of the protocol automaton M, the question of whether a transition is consistently switchable for a state of the test automaton F can no longer always clearly be answered as "yes" or "no".

If a transition T is consistently switchable for at least one of the occupancies of the state variables of the protocol automaton M represented by a state of the test automaton F, then the switching of transition T will be a potentially correct actual behaviour of communication participant A at this time. In such case, the protocol monitor PM will execute transition T speculatively. For this purpose, the state of the test automaton F will initially be restricted such that it represents the smallest possible superset of all states of the protocol automaton M for which transition T is consistently switchable. Because if-transition T switches in correct compliance with the protocol, then at the most from a state of this smaller state set of the protocol automaton M. Subsequently, the state transformation of transition T will be applied to the reduced state of the test automaton F. If, in doing so, constant or observed message parameters are contained in allocations to state variables, this may result in the state of the test automaton F being restricted even further with regard to the number of represented states of the protocol automaton M.

That what is mentioned here is the smallest possible a superset and not the exact set of states of the protocol automaton M with switching consistency of transition T is due to the fact that the state variables in the test automaton F independently of each other indicate subsets of the value ranges of the individual state variables of the protocol automaton M. These do not allow to represent all subsets of the state space of the protocol automaton M.

Since a transition may only be executed speculatively, the protocol monitor PM, starting from one state of the test automaton F, must treat all transitions which are consistently switchable for at least one state of the protocol automaton M in this manner. Every speculative execution of a transition will result in a new state of its own of the test automaton F which is generally more restricted though than the initial state.

So as to prevent an unlimited increase of the number of states of the test automaton F which need to be taken into consideration, the following rules are to be adhered to:

If a newly generated state of the test automaton F represents a (proper or improper) subset of the states of the protocol automaton M captured by another state of the test automaton F and has up to that time processed the same messages as the latter, the newly generated state of the test automaton F will be dismissed.

If a newly generated state of the test automaton F represents a proper superset of the states of the protocol automaton M captured by another state of the test automaton F and has so far processed the same messages as the latter, then the other state of the test automaton F will be dismissed.

Based on the messages observed, by means of speculative transition executions and continued restriction of coarse state descriptions, the described method converges to a definite state description, namely a state of the test automaton F which only represents one single state of the protocol automaton M anymore. This essentially concludes the capturing of the communication state.

In this process, the detection of errors and/or violations of the communication protocol results as a side product: As soon as no transition can switch from any state of the test automaton F in accordance with the observed flow of messages any longer, this constitutes a violation of the protocol by communication participant A. Because the protocol monitor PM has considered all the kinds of behaviour of communication participant A which were in agreement with the protocol up to that time; however, the present behaviour can no longer in any way be explained by the rules of the protocol.

The reduction up to the smallest representable superset of the switchable states according to what has been set out above will guarantee that any state of the protocol automaton M which may be responsible for correct subsequent behaviour will never be left unconsidered. This will ensure—despite the incomplete representability—that all errors detected by the protocol monitor PM always correspond to actual protocol violations on the part of communication participant A.

Not being able to completely represent coarse state descriptions, however, will result in the possibility that individual protocol violations on the part of communication participant A may theoretically be overlooked as long as there are still states of the test automaton F which represent states of the protocol automaton M. After this synchronization phase which is very short in the method according to the invention, each violation of the protocol will safely be detected.

In the following, a simple example is given as a further illustration of the method according to the invention. For this purpose, an exemplary communication protocol will first of all have to be defined and a relevant communication flow will have to be indicated.

The example used here is not relevant in practice. It will be referred to as the INI protocol in the following (INI standing for initiative). It is a symmetrical protocol with a single message type per transmission direction (DATA_IN, DATA_OUT). These messages may either be transmitted on one∩s own initiative or be the confirmation for a message which was previously received. In order to distinguish these meanings, each message contains a single parameter flag which may only take the values 0 and 1. A secure, reliable and sequence-maintaining transmission link is assumed to exist. FIG. 3 shows the state diagram of the assumed INI protocol automaton. Besides the basic states represented by the nodes of the state diagram, there are also the state variables seen, sent, ini. The names as well as the priorities (0, 1) of the transitions are indicated. State conditions which need to apply in addition to the respective basic state are marked "@". "+" and/or "−" precede specifications of input and/or output messages with a regulation for the flag parameter.

The three basic states of the INI protocol automaton have the following meanings:

Wait. No confirmations are still expected. Each of the participants may initiate a message transmission.

Talk. This instance has sent a message and is waiting for a confirmation.

Listen. This instance has received a message sent on the partner∩s initiative and still needs to confirm.

FIG. 4 is an exemplary view of a correct protocol flow. The transitions communication participant A has passed through in this example are indicated in the form of abbreviations on the left edge of the diagram, the messages bear the type name and the value of the flag parameter.

The flow example illustrates the following rules:

in a "normal" course, each message will be confirmed by a reply with the same flag parameter, with cycles with 0 and 1 alternating as parameters.

When the sending initiative is changed, however, the new initiator and/or the other communication participant will once again use the parameter value of the last cycle so as to distinguish his message from the next confirmation which may be due.

If one party and/or one communication participant tries to change the initiative and the party∩s message which indicates such trial crosses with a "regular" message of the other party or the other communication participant, then there will be a collision. This collision is resolved in that the message with flag=0 will be confirmed as usual and the message with flag=1 will be dismissed as if it had not been sent at all.

In order to further elucidate this exemplary method, the communication flow between communication participants A and B shown in the table below is used.

| Input | | Output | |
|---|---|---|---|
| No. | Message | No. | Message |
| 1 | DATA_IN (0) | | |
| | | 2 | DATA_OUT (0) |
| | | 3 | DATA_OUT (0) |
| 4 | DATA_IN (0) | | |
| | | 5 | DATA_OUT (0) |
| 6 | DATA_IN (0) | | |
| | | 7 | DATA_OUT (0) |
| | | 8 | DATA_OUT (1) |
| 9 | DATA_IN (1) | | |

The state of the test automaton F—in the following designated (1)—which the protocol monitor PM will have to take initially with regard to the protocol automaton M of communication participant A indicates all basic states of this protocol automaton and the complete ranges of values for the state variables:

$$\begin{array}{lcl} \{\text{Wait;Talk;Listen}\} & & \\ \text{seen} & \in & \{0;1\} \\ \text{sent} & \in & \{0;1\} \\ \text{ini} & \in & \{T;F\} \end{array} \quad (1)$$

With regard to this state, it must now be examined which transitions are to be applied speculatively to state (1) of the test automaton. The next messages due to be dealt with are messages 1 (input) and 2 (output).

Since transitions of higher priority take precedence over those of lower priority, the transitions having the highest priority will be dealt with first. These are Collision0 and Collision1.

If Collision0 switches correctly at communication participant A, then A must have been in state Wait beforehand, and state condition sent=0∧seen=1 must be valid (cf. FIG. 3). Accordingly, state (1) of the test automaton F will first be restricted according to the prerequisites for Collision0 and subsequently, the state transformation of Collision0 with the allocation ini=T will be applied to this reduced potential initial state. Two new states (2) and (3) of the test automaton will result therefrom, as may be seen from the diagrams below.

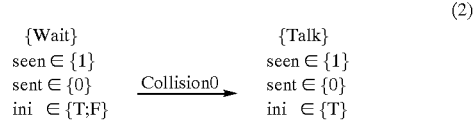

(2)

It is proceeded analogously for Collision1:

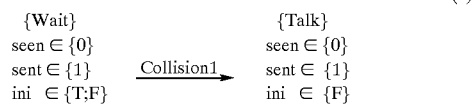

(3)

Since both new states (2) and (3) of the test automaton F correspond to state (1) as far as the processed messages are concerned and represent proper subsets of the states of the protocol automaton M captured by state (1), they will be dismissed. All correct kinds of sequential behaviour of communication participant A also directly start from state (1).

If a transition of lower priority switches correctly as Collision0 and Collision1 from state (1), then this is only possible provided that Collision0 and Collision1 are not switchable in the actual state of the protocol automaton of communication participant A—this ensues from the priority rule. Hence state (1) as the initial state may in principle be reduced by the states of the protocol automaton M with Collision0- or Collision1-switchability for the purposes of the following considerations. The reduction condition therefor is as follows (with St standing for the basic state of the automaton):

(St≠Wait ∨ sent≠0 ∨ seen≠1) ∧ (St≠Wait ∨ sent≠1 ∨ seen≠0).

In this case, state (1) cannot be reduced due to the fact that it can only be represented incompletely as no value of any state variable is completely excluded by the condition.

Next are the three input transitions. In consideration of message DATA_IN(0), for Receive the condition ini=F∧1−seen=0 results, the speculative switching operation being:

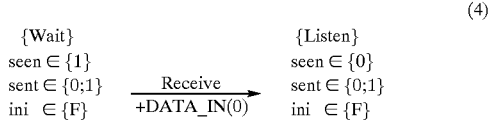

(4)

For Receive1st, state (1) is reduced according to ini=T∧sent=0:

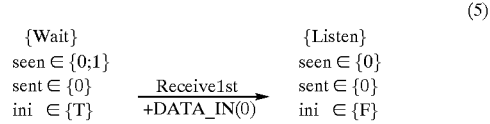

(5)

Since the above new states (4) and (5) of the test automaton F have processed the same messages and state (5) represents a subset of the states of the protocol automaton M of state (4), state (5) is immediately dismissed again.

Without special assumptions, with the exception of the basic state Talk, GetAcknowledge can switch:

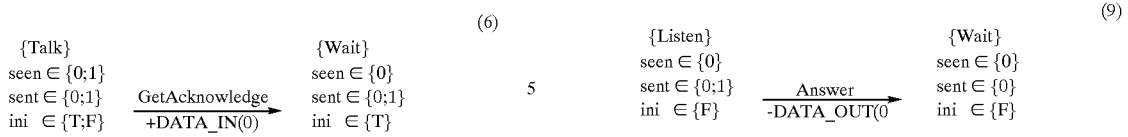

(6)

{Talk}　　　　　　　　　　　　　　　　{Wait}
seen ∈ {0;1}　　　　　　　　　　　　　seen ∈ {0}
sent ∈ {0;1}　GetAcknowledge　　　　sent ∈ {0;1}
ini ∈ {T;F}　──+DATA_IN(0)──→　　ini ∈ {T}

Now a very important particularity must be observed: Although the message flow according to the above table lists an input as the immediately following message, here message 1, it is quite possible that the next output message, here message 2, had been generated by a switching operation before message 1 was received. This is on the one hand due to the message transit time between communication participant A and protocol monitor PM, and on the other hand due to possible delays which may be caused by message buffers and the processing of the message at deeper protocol levels on the side of the communication participant. As a consequence, the protocol monitor PM will always also have to consider the next output message if the latter appears a certain time period after a due input message in the observed communication. In the individual case, the concrete forecast time will have to be determined depending on the protocol and the architecture used.

For this reason, the two output transitions will now be examined with regard to message 2, DATA_OUT(0). For Transmit, the condition $(ini=T \wedge -sent=0) \vee (ini=F \wedge seen=0)$ will be obtained which, however, does not allow for a reduction due to the indeterminacy of ini in state (1):

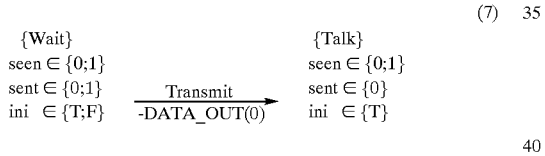

(7)

{Wait}　　　　　　　　　　　　　　　　{Talk}
seen ∈ {0;1}　　　　　　　　　　　　　seen ∈ {0;1}
sent ∈ {0;1}　　Transmit　　　　　　sent ∈ {0}
ini ∈ {T;F}　──-DATA_OUT(0)──→　ini ∈ {T}

Answer requires that seen=0, thus providing a restriction:

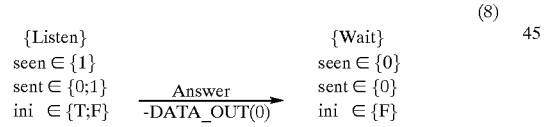

(8)

{Listen}　　　　　　　　　　　　　　　{Wait}
seen ∈ {1}　　　　　　　　　　　　　　seen ∈ {0}
sent ∈ {0;1}　　Answer　　　　　　　sent ∈ {0}
ini ∈ {T;F}　──-DATA_OUT(0)──→　ini ∈ {F}

Thus all possibilities for state (1) of the test automaton F have been dealt with. All transitions were switchable which is not surprising in view of the fact that no information was available on the actual initial state. The states of the test automaton F which are further to be considered are states (4), (6), (7), (8).

For state (4) message 1 has been attended to, and only the output message 2, DATA_OUT (0), is due to be processed; since input messages recorded after it could not have reached communication participant A earlier than protocol monitor PM. From the basic state Listen only the transition Answer can switch, with the reduction condition seen=0, which is fulfilled for all states of the protocol automaton M with regard to state (4):

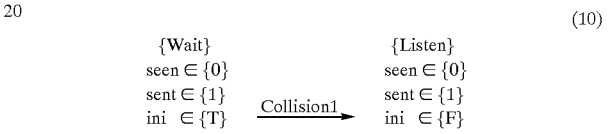

(9)

{Listen}　　　　　　　　　　　　　　　{Wait}
seen ∈ {0}　　　　　　　　　　　　　　seen ∈ {0}
sent ∈ {0;1}　　Answer　　　　　　　sent ∈ {0}
ini ∈ {F}　──-DATA_OUT(0)──→　　ini ∈ {F}

This new state (9) of the test automaton F is the only sequential state of state (4) and will replace the latter in the state list (6), (7), (8) and (9).

State (6) has likewise received the 1st message and will, as a next step, have to process output message 2. There are five transitions from the basic state Wait. What applies again here is that they must be treated according to descending priority.

Owing to the condition seen=1, Collision0 is completely irrelevant. Collision1 requires that $sent=1 \wedge seen=0$, which provides for a successful reduction of state (6):

(10)

{Wait}　　　　　　　　　　　　　　　　{Listen}
seen ∈ {0}　　　　　　　　　　　　　　seen ∈ {0}
sent ∈ {1}　　Collision1　　　　　　sent ∈ {1}
ini ∈ {T}　　────────→　　　　　ini ∈ {F}

The new state (10), however, represents a subset for state (4) with the same progress of the communication, and will thus be dismissed. For the remaining transitions which are of lower priority, state (6) will be reduced to those states of the protocol automaton M in which Collision1 is not required to switch. The reduction condition is $sent \neq 1 \vee seen \neq 0$, which indeed results in a restriction of state (6) due to the fact that the second term is unfulfillable:

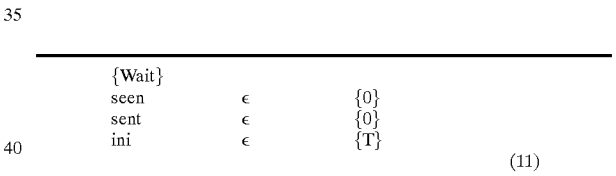

{Wait}
seen　∈　{0}
sent　∈　{0}
ini　∈　{T}

(11)

What remains as the only transition without input message is Transmit. Its condition $1-sent=0$ required by DATA_$out$ (0), however, is not fulfilled by this new state (11).

Now only states (7), (8) and (9) remain.

For state (7) only the 2nd message has been used so far, due as the next messages are thus in principle messages 1 and 3, DATA_$IN$(0) and DATA_$OUT$(0). It is to-be assumed here that message 3 was recorded at such a late time that it could not have been generated before message 1 was received. Consequently, only message 1 needs to be taken into account.

The only transition starting from Talk is GetAcknowledge which does not include any conditions:

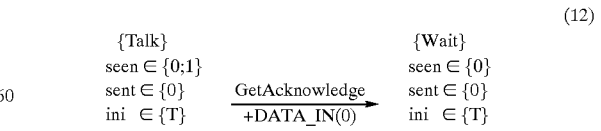

(12)

{Talk}　　　　　　　　　　　　　　　　{Wait}
seen ∈ {0;1}　　　　　　　　　　　　　seen ∈ {0}
sent ∈ {0}　　GetAcknowledge　　　sent ∈ {0}
ini ∈ {T}　──+DATA_IN(0)──→　　ini ∈ {T}

With this new state (12), the resulting state list is (8), (9) and (12). For the first time, only definite state descriptions appear here, i.e. there is only one state of the protocol automaton M for each state of the test automaton F. As a consequence, from now on each defective behaviour of communication participant A will definitely be detected. For the same reason, there will no longer be any actual restrictions of state descriptions now, but only fulfilled or unfulfilled conditions.

State (8) exhibits the same progress of the communication as state (7), consequently, only message 1 is due, a DATA_$_{IN}$(0).

As seen=sent=0 applies here, Collision0 and Collision1 are not switchable. ReceiveIst requires that ini=T and is likewise dismissed. Receive fails because of the present flag parameter which results in the condition 1−seen=0. The remaining transitions generate outputs which are inconsistent with the message flow according to the prerequisite of the predictable range.

Consequently, only states (9) and (12) still occur.

For state (9) only output message 3 needs to be considered, messages 1 and 2 having already been processed. The output basic state is Wait. Owing to the identity of seen and sent, only the transition Transmit with the—fulfilled—condition seen=0 remains:

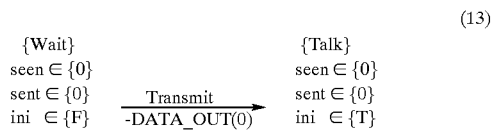
(13)

The new state list comprises the states (12) and (13) of the test automaton F.

The communication progress compared to state (12) corresponds to the one accomplished with regard to state (9); after messages 1 and 2 have been considered, only a DATA_OUT(0) is pending.

The collision transitions are dismissed due to the states and the input transitions are dismissed due to the communication progress. Transmit requiring that 1−sent=0 is unfulfilled.

Consequently, the definite state (13) is certain to be the only state description for the communication participant which needs to be considered. The protocol monitor PM has now been synchronized completely.

In state (13) of the test automaton F the messages 1 to 3 have been processed; messages DATA_$_{IN}$(0) (No. 4) and DATA_$_{OUT}$(1) (no. 5) are due for processing. From Talk, only GetAcknowledge can switch, with no further condition having to be fulfilled:

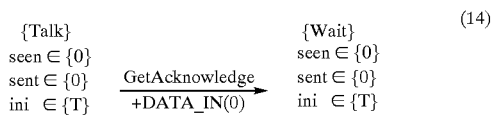
(14)

Now, with messages 1 to 4 having been dealt with, the next transition will only consider message 5, DATA_$_{OUT}$(0), since it is an output. Hence, in the basic state Wait, only Transmit will remain again, and this time the condition is 1−sent=1 and is fulfilled:

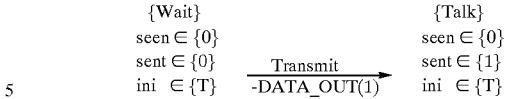

Now two messages are possible again, namely DATA_$_{IN}$(0) as the 6th and DATA_OUT(0) as the 7th so as to determine a transition having Talk as the starting point. As already the case with state (13), GetAcknowledge switches:

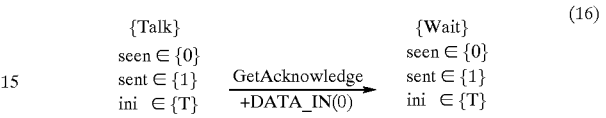
(16)

As the next message only output 7 may be considered, it is DATA_OUT(0). For the moment, however, sent= 1∧seen=0 is fulfilled which—due to the priority rules—requires the immediate switching of Collision1 from Wait:

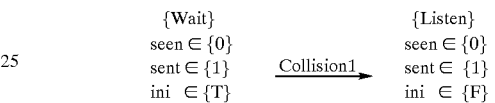

Listen may only be exited via Answer. Thanks to DATA_OUT(0) te condition seen=0 results therefor, which is fulfilled by state (17):

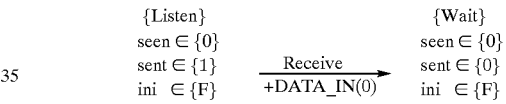

The next message, i.e. the 8th, with DATA_OUT(1), also constitutes an output and therefore needs to be considered on its own. As the collision conditions are not fulfilled this time, Transmit thus has to switch. Owing to ini=F, however, the output rule of Transmit will result in seen=1 which is thus contradictory to the last state (18) present.

The INI protocol cannot explain the observed communication at this point anymore, a protocol violation on the part of communication participant A was detected. In actual fact, A would have had to indicate a change of initiative by means of the flag value of the last cycle, i.e. 0.

Resynchronization would start now since no information is available any longer as to the actual state of the protocol automaton M of communication participant A. For this purpose, the protocol monitor PM takes up the initial state (1) again, in which message 8 causing the error may already be used as the resumption point within the communication. The exemplary measuring process ends here.

As a result of the measuring example, the actual flow of the communication may now be reconstructed without difficulty. Owing to the summarization of two states (10) and (11) as set out-above, the result at the beginning of the communication is not unique. FIG. 5 shows the two equally possible variants up to the time when the error occurs.

The exemplary protocol us ed seeks to accomplish—in an extreme way—that the meaning of individual messages may only be deduced from the context. In this regard, it makes even higher demands on the protocol monitor PM than most real communication protocols would. Nevertheless, the synchronization phase was concluded after only three messages.

Additionally, it should be noted that numerous protocols, in particular of the OSI 3 layer, render the service of establishing a plurality of virtual connections via the same communication medium. In such cases, the protocol procedures specific for each connection are typically modelled by a separate protocol automaton per connection. In addition, there is often at least one additional automaton which takes on coordinating tasks, e.g. the releasing of all existing connections or the activating of further automatons for newly established connections. The total state of an instance is then formed by the states of all active protocol automatons.

If there are n active protocol automatons per communication participant, for each of which the protocol monitor considers m individual states of its test automaton, then this is tantamount to mn variants for the total state of the instance. This exponentiation of the state variants will very fast exceed the limits of an acceptable extent of computational work if all total states are to be considered. In order to obtain acceptable solutions also in such cases, it is demanded that all combinations of the states of the test automaton which exist for all active protocol automatons are always taken as descriptions of total states of the instance which have to be considered; with all interdependencies between different protocol automatons being disregarded. Each test automaton monitors the very part of the communication which is dealt with by the respective allocated automaton of the communication protocol. In this way, every possible state of a protocol automaton, together with every possible state of a further protocol automaton, will form a state combination to be considered. Then the measuring method can be independently applied to the individual automaton-specific states of the test automaton of which there are a mere m·n in the above notation.

Indeed such protocol automatons in real protocols operate largely independently. However, dependencies may occur in administrative tasks such as the establishment of a group of connections. Because of the above requirement, the protocol monitor according to the invention has to admit too many total states in such special cases since the speculation for an actual state for a protocol automaton cannot influence the assumptions for all other automatons. That this will result in errors being overlooked, however, is improbable in practice or must be accepted since more expense would otherwise be required.

It is to be noted further that in the above example no time conditions were defined for the response behaviour of communication participant A. However, such time conditions may be incorporated in the method in accordance with the procedure noted above. Timers are modelled as indefinite state variables which will indicate the possible or required time range for subsequent switching operations within the state conditions. A timer is started by the allocation to the relevant timer variable within the framework of the state transformation of a transition.

What is claimed is:

1. A method for checking a data exchange between communication participants (A, B) established on a communication medium (CM) in compliance with a communication protocol wherein the communication protocol is defined by a protocol automaton based on an extended finite state automaton principle, said automaton describing the correct communication behaviour of a communication participant (e.g. A), the data exchange is captured by means of a protocol monitor (PM) connected to the communication medium (CM), said monitor including a test automaton which is likewise defined according to the extended finite state automaton principle, the test automaton contains the same state variables as the protocol automaton defining the communication protocol, with an exception that each state variable of the test automaton is allocated one element of the power set of the value range of the corresponding state variable of the protocol automaton so that each allocation of the state variable of the test automaton represents a set of states for the protocol automaton which are to be considered, based on one state of the test automaton which comprises all the values of the state variables of the protocol automaton, all state transitions of the protocol automaton which are permissible for at least one of the states of the protocol automaton described by the respective state of the test automaton are consecutively speculatively applied to each of the existing states of the test automaton, which state transitions are furthermore compatible with the messages occurring in the captured data exchange, wherein a) the respective state of the test automaton is first of all stated more precisely according to the logical switching condition of the state transition to be applied and an associated message in the captured data exchange, b) subsequently, in accordance with the state transition of the protocol automaton, a single sequential state of the test automaton is formed describing all the states of the protocol automaton which may be generated as a result of said state transition, c) after the application of all permissible state transitions, the respective state according to above feature a) of the test automaton is replaced with all sequential states generated from this state of the test automaton according to above feature b), a violation of the protocol is reported if after a processing step according to above feature c) the states of the test automaton have all been examined without success.

2. An application of the method according to claim 1 in a data exchange between communication participants in compliance with a communication protocol, said method being-defined based on the principle of a plurality of cooperating extended finite state automatons, in which the protocol monitor contains test automatons in a number corresponding to the number of extended finite state automatons defining the communication protocol, and each test automaton is defined by state variables in accordance with the respective allocated automaton of the communication protocol.

3. The application of claim 2 in the case of a plurality of virtual connections via the communication medium, each of which is modelled by a separate protocol automaton characterized in that, each test automaton monitors the very part of the communication which is dealt with by the respective allocated automaton of the communication protocol.

* * * * *